United States Patent [19]
Deshon

[11] Patent Number: 6,120,872
[45] Date of Patent: *Sep. 19, 2000

[54] SHOWER MAT

[76] Inventor: Danyale Julia Deshon, 7911 York St., Unit C, Denver, Colo. 80229

[ * ] Notice: This patent is subject to a terminal disclaimer.

[21] Appl. No.: 08/459,300

[22] Filed: Jun. 5, 1995

[51] Int. Cl.[7] ...................................................... B32B 1/06
[52] U.S. Cl. .............................. 428/74; 428/76; 428/142; 428/143; 428/137; 156/196; 156/276
[58] Field of Search ................................ 428/74, 76, 143, 428/142, 141, 137; 4/582, 583; 52/177; 156/219, 196, 222, 276

Primary Examiner—Alexander Thomas
Attorney, Agent, or Firm—Famiglio & Associates; Robert B. Famiglio, Esq.

[57] ABSTRACT

Disclosed is a disposable shower mat for application to the bottom of a bathtub or shower stall, and comprised of a thin flexible, generally rectangular base sheet of water-impervious material, and a top sheet, coextensive with the base sheet, of a thin, pliable water-impervious material. A multitude of randomly curled wood fibers is distributed over the upper surface of the base sheet, and a layer of heat-activated adhesive secures the top sheet to the base sheet and affixes the wood fibers therebetween in such a manner that the upper surface of the top sheet is embossed with the impressions of the wood fibers so as to provide a textured slip-resistant surface.

16 Claims, 2 Drawing Sheets

SHOWER MAT

BACKGROUND OF THE INVENTION

1. Field of the Invention

The present invention relates to portable mats for covering the bottom surfaces of bathtubs and shower stalls, and more particularly to such mats that are disposable.

2. Description of the Prior Art

There is a large number of establishments that provide bath and shower facilities for their members and the general public, and truck stops, hospitals, hotels and motels are a few examples. Because harmful bacteria and dirt can accumulate on bathtub and shower surfaces, particularly on bottom surfaces, there is a public as well as a private health concern that those who use such facilities be guarded against the health risks presented by such contamination. It is well known, for example, that one must guard against fungal infections such as Athlete's Foot that are often transmitted by direct contact with infected surfaces on bathtubs and showers.

Another major concern with using both private and public bath facilities is the hazard of slipping and falling, since bathtub and shower bottoms can be quite slippery when wet.

The contamination risk could be eliminated if the bath and shower surfaces were cleaned and sanitized after each use, however in many cases this is neither practical nor economically feasible to do. One approach to the desease transmission problem is to use shower shoes, but they are often uncomfortable and unwieldly to use, and they do not necessarily eliminate the hazard of slipping.

Sometimes a grid of wooden or plastic material is installed on a shower floor, but such grids can themselves be slippery and uncomfortable, and can become contaminated with accumulations of dirt and harmful microorganisms.

Another conventional approach is to use portable rubber or latex mats, the mats sometimes having integral suction cups in their bottom surfaces for gripping the bath floor, and a textured or roughened skid-resistant top surface. In some cases rubber mats incorporate flexible magnetized sheets that attract the mat to the metal bottom of a tub or shower stall. See U.S. Pat. Nos. 5,069,951 and 4,512,044. Although portable rubber mats and the like may address the slippage hazard, there remains the need to regularly clean and sanitize them to prevent contamination. It is also noted that such mats are not inexpensive to produce and sell.

SUMMARY OF THE INVENTION

In view of the above-mention and other drawbacks and limitations of the prior art, it is a general object of the present invention to provide a low-cost, yet highly effective contamination prevention system for application on bathtub and shower stall floors.

Another general object is to provide such a system that also effectively addresses the hazard of slippage underfoot.

Yet another object is to greatly reduce the need to clean and sanitize bathtub and shower stall floors.

A more particular object is to provide a bath mat that is disposable, and which provides a top surface that is skid-resistant as well as being comfortable to stand on, and which mat is also an effective hygenic barrier.

A further object is to provide such a mat that lends itself to being produced at a relatively low cost, such that it is economically feasible as a disposable product.

Yet a further object is to provide a mat that will not slip on a wet surface, and that is lightweight and easy to transport and store in bulk quantities.

These and other objects and advantages are provided by the present invention of a disposable mat for application to the bottom of a bathtub or the floor of a shower stall, the inventive mat having a top sheet that is thin, flexible, water-impervious and pliable, and a bottom sheet that is also thin, flexible and water-tight, and that has a bottom layer that is adapted to make slip-resistant engagement with a wet surface.

The bottom surface of the top sheet is adhesively bonded to the top surface of the bottom sheet, and the invention features a layer of a multitude of curly wood fibers that is sandwiched and affixed between, and embraced by, the adhesively bonded sheets, whereby the top surface of the top sheet is caused to be embossed with the impressions of the multitude of fibers so as to provide a slip-resistant character to the top of the mat.

In a preferred embodiment the top sheet is a film of metalized polymeric material, and the bottom sheet is a paper material covered with an upper film of water-tight polymeric material that has adhesive properties when heated to a predetermined temperature, and the fibers are finely curled natural shreaded wood fibers.

Also in a preferred embodiment the bottom sheet has integral flaps extending inwardly from its periphery, which flaps are adhered to marginal portions of the top sheet to seal the edges of the mat and to provide a reinforced border for the mat.

In another embodiment an opening is provided in the mat for overlaying a drain.

DETAILED DESCRIPTION OF THE INVENTION

Figure 2:
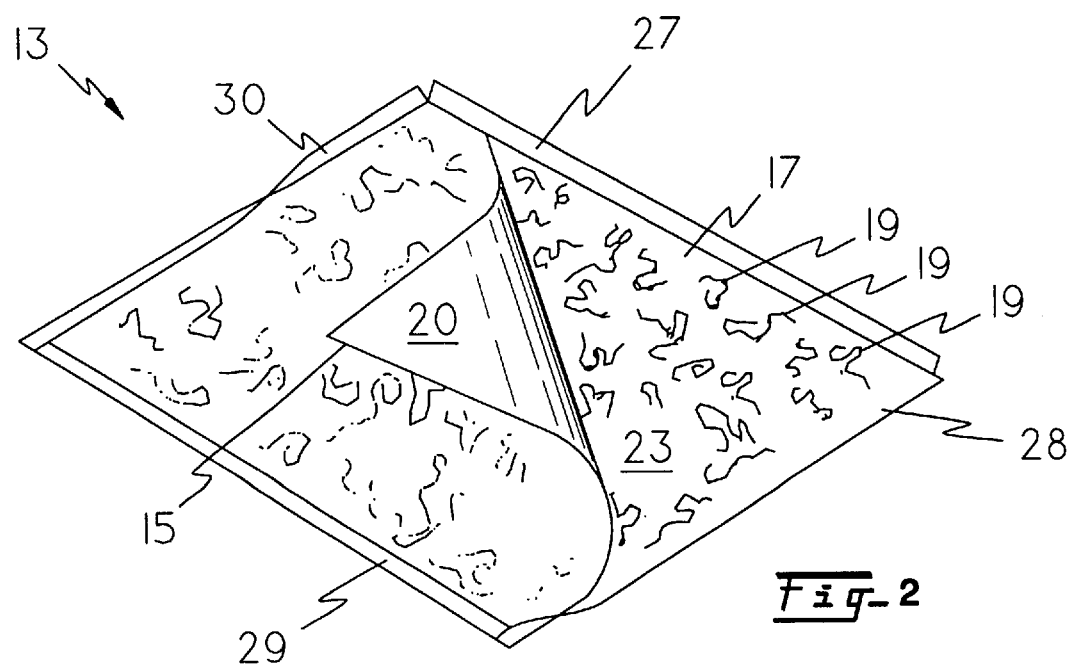
FIG. 2 is a partially exploded view of the mat shown in FIG. 1.

Referring now to the drawings, FIG. 2 shows that the main components of a preferred embodiment of a disposable shower mat 13 according to the present invention include a top sheet 15, a bottom sheet 17, and a multitude of curly fine fibers 19.

The top sheet 15 is comprised of a thin, flexible, water-impervious and pliable material such as 36 or 48 gage metalized polyester sheet material that is provided with a thin bottom coating 20 of a 3 mil linear low density polyethylene, or other equivalent material that will take on adhesive properties when pressed with a hot iron or heated pressure plate.

Figure 1:
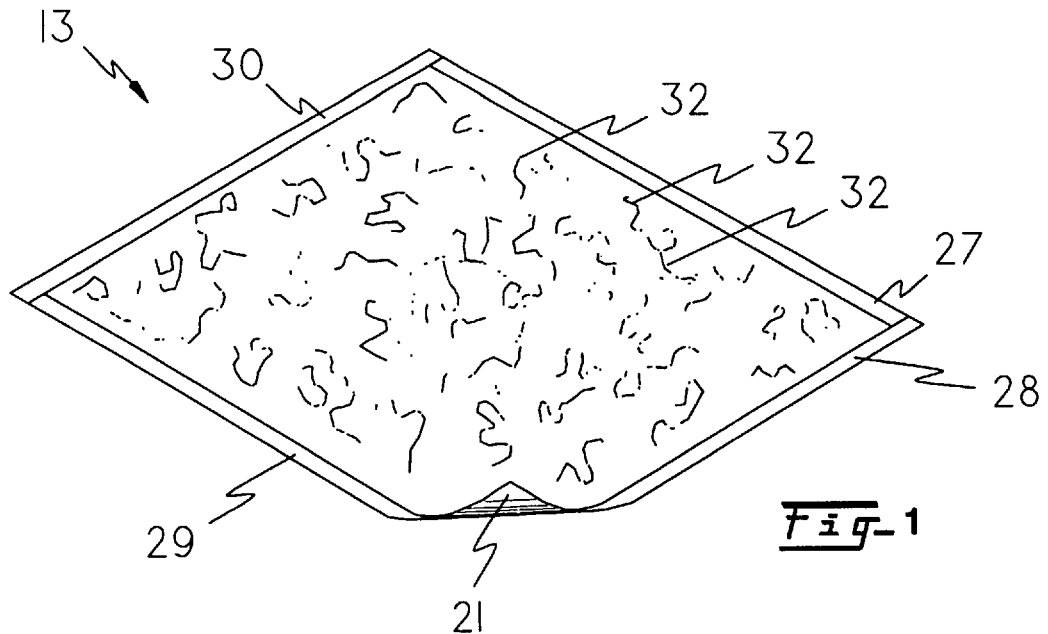
FIG. 1 is a perspective view of a bath or shower mat according to the present invention.

The bottom sheet 17 is also thin, flexible, and water-impervious, and in the preferred embodiment it is a material comprising a top coating 23 of wax, and a paper bottom 21 (shown in FIG. 1). This sheet 17 is equivalent to what is known in the food packaging industry as "freezer wrap". It is noted that the coating 23 is not only water-tight, but like the coating 20 described above, will take on adhesive properties that are sufficient to quickly bond sheet 17 to the top sheet 15 when a conventional heated press or hot industrial iron is used to press sheet 17 against sheet 15.

In the preferred embodiment the fibers 19 are finely curled natural shreaded wood fibers, however equivalent fibers can be used in the invention.

It should also be understood that other suitable means of bonding the top sheet to the bottom sheet are contemplated under the invention, the primary consideration being the provision of means to quickly and permanently bond the two sheets together, and to affix and sandwich the fibers 19 between the two sheets, in a manner to be described.

One method of fabricating the mat 13 involves inverting the top sheet 15 on a flat surface and then evenly distributing a quantity of fibers 19 over the surface of sheet 15. Then the bottom sheet 17 that has peripheral flaps 27, 28, 29 and 30, is positioned upon the fiber-covered sheet 15. A conventional heated iron or other flat heated surface of a press is then used to heat the coating 23 of sheet 17 (as well as coating 20 of sheet 15), as sheet 17 is pressed into engagement with the sheet 15. This causes the coatings 23 and 20 to take on adhesive properties and to cause the immediate bonding of the engaged surfaces. Care should be taken to press out any trapped air pockets between the sheets. The final step is to fold the flaps 27, 28, 29 and 30 over against marginal portions of sheet 15 and to bond the flaps using heat and pressure, as above. This seals the mat edges and provides a reinforced border as shown in FIG. 1. FIG. 1 also shows the unique skid-resistant textured top surface that results by virtue of the pliable top sheet 15 taking on the impressions of the underlying fibers 19, and producing multiple embossings 32.

It has been discovered that the paper bottom 21, when wet, will tend to cling to the bottom surface of a bathtub or shower stall, thus providing mat 13 with a unique skid resistant bottom surface as well as the unique top surface mentioned above.

Figure 3:
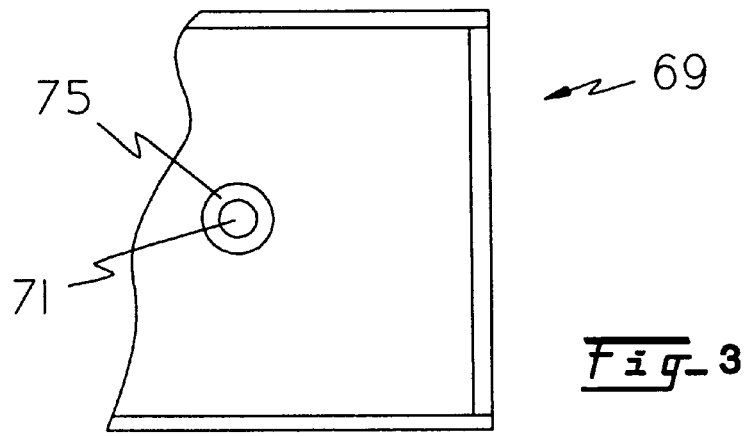
FIG. 3 is a partial view of a varient of the invention.
Figure 4:
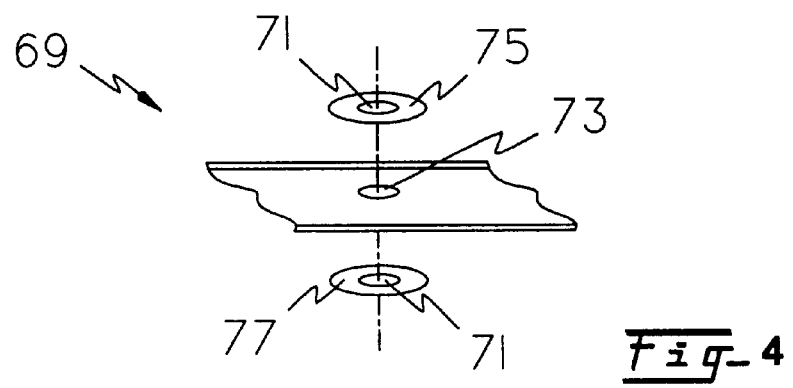
FIG. 4 is an exploded partial perspective view illustrating the fabrication of the drain opening in a mat according to the present invention.

A varient of the invention, shown in FIG. 3, has an opening 71 that is designed to overlay a drain opening, and FIG. 4 illustrates the fabrication of such an opening wherein a hole 73 is first cut in mat 69. Identical pieces 75 and 77, of flexible water-impervious material having pressure-sensitive adhesive on one side, and matching openings 71 that are smaller than opening 73, are pressed into engagement with each other from opposite sides of the mat to form the reinforced and sealed opening shown in FIG. 3.

Figure 5:
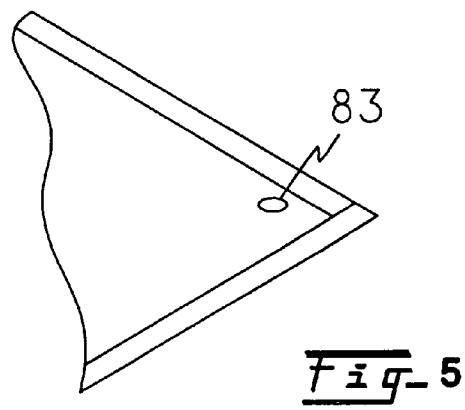
FIG. 5 is a partial view of another varient of the invention.

In another varient of the invention, shown in FIG. 5, a small opening 83 is provided near each corner of the mat for the purpose of enhancing contact of the mat with the bathtub or shower bottom surface in these regions, by allowing water or air trapped below the mat to escape.

It is not intended that the invention be limited to the preferred embodiments shown, as various modifications may readily occur to those of ordinary skill in the art, given the benefit of this disclosure. Thus, the invention is to be given the full breath and scope as defined in the claims which follow.

What is claimed is:

1. A disposable mat for application to the bottom of a bathtub or a shower stall, including:

a) a top sheet comprised of a thin, flexible, water-impervious and pliable material;

b) a bottom sheet of a thin, flexible water-impervious material; and c) a layer intermediate said bottom sheet and said top sheet comprising a multitude of randomly curled fibers, and wherein said top sheet is bonded to said bottom sheet to affix said fibers between said sheets, and to embrace said fibers whereby said top sheet is embossed with the impressions of said fibers to provide a textured slip-resistant top surface to said mat.

2. A mat as defined in claim 1 wherein said top sheet is comprised of a polymeric material.

3. A mat as defined in claim 2 wherein said top sheet is made of metalized polymeric material.

4. A mat as defined in claim 3 wherein said top sheet is of matalized polyester.

5. A mat as defined in claim 1 wherein said fibers are finely curled natural shreaded wood fibers.

6. A mat as defined in claim 1 wherein said bottom sheet is comprised of a polymeric material.

7. A mat as defined in claim 1 wherein said bottom sheet includes a lower layer of paper.

8. A mat as defined in claim 7 wherein said bottom sheet has a top layer of a polymeric material.

9. A mat as defined in claim 7 wherein said bottom sheet has an upper layer of wax.

10. A mat as defined in claim 1 wherein said top sheet is bonded to said bottom sheet by an adhesive activated by heat and pressure.

11. A mat as defined in claim 1 wherein said top sheet has a lower coating of a substance that takes on adhesive properties when subjected to heat and pressure.

12. A mat as defined in claim 1 wherein said bottom sheet has an upper coating of a substance that takes on adhesive properties when subjected to heat and pressure.

13. A mat as defined in claim 1 wherein said bottom sheet has peripheral flaps that are bonded to marginal portions of said top sheet to seal the edges of said mat.

14. A mat as defined in claim 1 wherein said mat has an opening adapted to overlie the drain opening of said bathtub or shower stall.

15. A mat as defined in claim 1 including a relatively small opening located near each corner of said mat.

16. A method of providing a disposable shower mat with a slip-resistant upper surface that is textured, including the steps of:

a) providing a lower sheet of flexible material;

b) providing a top sheet of a thin flexible water-impervious material that is pliable;

c) sandwiching a layer of fine curly fibers between said top and lower sheets; and d) bonding said top sheet to said lower sheet to affix said fibers therebetween, whereby impressions of said fibers are formed in the upper surface of said top sheet.

* * * * *